United States Patent [19]
Johnson

[11] Patent Number: 5,598,474
[45] Date of Patent: Jan. 28, 1997

[54] PROCESS FOR ENCRYPTING A FINGERPRINT ONTO AN I.D. CARD

[76] Inventor: Neldon P. Johnson, 512 S. 860 East, American Fork, Utah 84003

[21] Appl. No.: 402,014

[22] Filed: Mar. 10, 1995

Related U.S. Application Data

[63] Continuation-in-part of Ser. No. 218,743, Mar. 29, 1994, abandoned.

[51] Int. Cl.⁶ ........................................... H04L 9/00
[52] U.S. Cl. ..................... 380/23; 380/9; 380/25; 380/49; 380/54; 380/59; 235/380
[58] Field of Search ..................... 380/9, 23, 24, 380/25, 54, 59, 49, 50; 235/379, 380

[56] References Cited

U.S. PATENT DOCUMENTS

| | | | |
|---|---|---|---|
| 3,581,282 | 5/1971 | Altman | 235/380 X |
| 4,811,408 | 3/1989 | Goldman | 235/380 X |
| 4,993,068 | 2/1991 | Piosenka et al. | 380/23 |
| 4,995,086 | 2/1991 | Lilley et al. | 235/380 X |
| 5,412,727 | 5/1995 | Drexler et al. | 380/24 |

Primary Examiner—Bernarr E. Gregory
Attorney, Agent, or Firm—K. S. Cornaby

[57] ABSTRACT

The invention and process utilizes any number of biological parts to provide a proof of legitimacy and from them generate and verify a personal identification card (ID). This rendition of the invention deals mainly with fingerprints, but does not preclude the use of other biological parts. The invention is unique in being able to render complex forms into unique biological characteristic codes of the unique biological parts, especially the fingerprint, and then to be able to encode that code onto the magnetic strip of an ID card or credit card. The invention renders complex biological forms into numeric representations of the unique biological parts and especially the fingerprint. The number generated thereby is encoded onto the magnetic strip of an ID card or credit card. A comparison is made of the live biological part to the number on the card to identify that the person using the card as the legal owner of the card, thus automatically identifying the person as the legal card holder or rejecting that person as not being the legal card holder. This makes it possible to use the card safely without the need for personal attendants to ensure the transaction is carried out by the legal owner of the card.

10 Claims, 5 Drawing Sheets

PROCESS FOR ENCRYPTING A FINGERPRINT ONTO AN I.D. CARD

BACKGROUND OF THE INVENTION

This is a continuation-in-part of U.S. patent application Ser. No. 08/218,743, filed Mar. 29, 1994, now abandoned.

This invention relates to an apparatus that can read and identify fingerprints automatically, and then store the information about the fingerprint on an I.D. card's magnetic strip of less than 100 bytes. Once stored on the magnetic strip the information can then be read into the apparatus along with the actual fingerprint to be compared. The apparatus will then automatically make a comparison check to see if they match. The apparatus can also compare fingerprints stored in a memory device that will allow recall to find a match out of several different fingerprints on file if one is there. The invention can store the fingerprint in a data base based upon the deciphered number along with the actual fingerprint, thus providing for faster retrieval times and no personal intervention.

The current methods for identifying and storing fingerprints is very time consuming and labor intensive. The information cannot be stored onto a magnetic strip of less than 100 bytes, nor can the current systems store the fingerprints using a numerical model.

The need to reduce credit card fraud, to restrict persons from entering restricted areas, allow for unattended use of cards for making purchases or bank transactions, and to speed up the transaction in the retail environment is widely apparent.

The solution to this problem must be found in identifying a person who has the legal right to use an ID card, such as a credit card, debit card, check cashing card, driver's license, social security card, etc. A method is needed to provide a way for these cards to be used only by their rightful owner, such as the ability to place upon the magnetic strip of any plastic ID card, such as credit cards, etc., certain characteristics of a person's fingerprint. Such a method would require a means for reading that information and comparing that information to that of a live fingerprint; and then being able to print the live fingerprint onto the transaction in place of a signature.

Today, most ID cards, such as credit cards, use "PIN" or a "personal identification number" to access remote unattended devices. Each card has associated with it information, either on the magnetic strip or in a central data base, that is used to check the PIN when the card is used. When the card is used the user must provide the proper PIN number. The PIN is then checked against the data base, and if they match the transaction is allowed. This, however, requires the user to remember the PIN or save it separately.

Other solutions have also been developed. For example the process of puffing pictures or images on the cards. This works fairly well as long as there is a clerk involved in the transaction. Even this is not foolproof. The card could have been altered or forged. The data on the magnetic strip could belong to another individual and the cashier would have no way of knowing this.

This problem was addressed by U.S. Pat. No. 5,241,600. The solution that was proposed was to place an image on the card. This image would be deciphered by a device in such a way as to relate the image on the card to the data placed on the magnetic strip. When the card is used, the card is placed into a special reader. The reader reads the data from the card and compares those data to the image that was placed on the card. This provides a way to protect the cards from being forged or changed. However, this also requires a transaction involving a clerk. Such a process, however, does not address the problem of use of the card the card holder with a money machine. Although the card could not be readily forged, the card could still be used by unauthorized persons at unattended locations.

U.S. Pat. No. 4,582,985 addresses the issue of making the card safe from unauthorized uses, but is less appealing in other ways. One, it requires sophisticated circuitry in or on the card. Next, it requires exact placement of the finger to get proper registration.

U.S. Pat. No. 4,532,508 uses a different, but unique, way of making an ID card safe from unauthorized use by using a laser. Using a holograph procedure the laser takes a fingerprint, encodes it, and then places the holographic image onto a photographic material. However, because this patent requires the image to be placed on photographic material, the information cannot be readily stored in other media to facilitate quick and easy retrieval of that fingerprint from other media or data bases. It also uses a completely different apparatus to put the fingerprint onto the card.

U.S. Pat. No. 5,095,194 is very much like U.S. Pat. No. 4,532,508, differing in the way that it uses the filtering process. However, again the main difference is in the way the fingerprint is deciphered. It does not allow for easy retrieval of the fingerprint on any other type of media.

U.S. Pat. No. 5,268,963 uses the whole image. This process requires storing the fingerprint onto the card in digital picture form. This process, even when compressed, uses a great deal of memory space and could not use the magnetic strip on existing cards; nor does it allow for easy cataloging of fingerprints into a mass storage system for latter keyed retrieval. It is also somewhat more expensive to manufacture because of the complexity of the circuitry required on the card.

U.S. Pat. Nos. 4,811,408 and 4,972,476 provide a way to make identification cards unforgettable. However, a way to identify live image indicia with any information on the card itself is not provided. The present invention not only provides a way to make the identification card unforgettable, but also provides a way to compare the unique number of the image indicia with the live physical immutable biocharacteristics identification.

U.S. Pat. No. 4,712,103 is very similar to U.S. Pat. No. 4,993,068 in using an image indicia. Both digitize the image. Both take the actual digital rendition of the image and store the image onto a storage device of some kind. U.S. Pat. No. 4,712,103 uses a key instead of other storage device; nevertheless, it does not take the digitized image and produce from that biocharacteristic image a unique numeric value that represents the digitized image. This invention takes the image, digitizes the image and then sends that digitized image into a computer program operating inside the computer. The computer program then takes the digitized image of the live physical immutable biocharacteristic identification and converts the image into a unique numeric value that can only be associated with said biocharacteristic image. The numeric value that the biocharacteristic image has been converted to cannot be used to reproduce the biocharacteristic image. The only way for a comparison to be made is for a live biocharacteristic image to be sent to the computer program from some form of reader or transducer. Here the live image is convened to its unique numeric value. If the unique numeric value is nearly the same, then the computer indicates a match. If the numeric value of the live biocharacteristic image is outside of the tolerances given, then a no match indication is given by the computer.

U.S. Pat. No. 5,297,202 is involved strictly with the concept of capturing an image and then combining the captured image onto the transaction. This invention does not address the issue of providing a way to protect against forged I.D's, nor does it provide a way to identify the person to be the rightful user of said I.D.

U.S. Pat. No. 4,532,508 uses totally different apparatus for storing information. It uses a basic coherent light input in the form of a laser, which directs the light beam to a beam splitter and also to a slide which has on it a photograph of the fingerprint to be used in generation of the holographic image stored on the identification card. The present invention differs in several aspects. First it does not use photographic material to store any biocharacteristics. Second, it does not convert the biocharacteristics to a digital form, nor is it transmitted to a computer to be further compared. Thirdly, U.S. Pat. No. 4,532,508 does not convert the digital biocharacteristic image into a unique numeric value that is uniquely related to the image. Thus, it could not reproduce the image itself from the numeric value. In order for the numeric value to act as a means of identifying the person it is necessary to have the person input into the system a live biocharacteristic image that should match with the one that is encoded onto the storage medium.

U.S. Pat. No. 4,993,068 does not identify the use of a computer program to find the unique biological identifying parts and separating them from the other parts of the image. It uses the whole biological image to compare it with the live image. This is where the present invention defers. The present invention deals with first separating and or finding and identifying the unique patterns and identifying marks from the rest of the biological image. It finds only the unique parts of the biometrics image and then identifies them by giving them a unique identification number or code and then combines them into a unique identification code. The unique identification code is composed of a location reference and a biologically unique identifiable mark.

In the present invention the computer program identifies what type of unique identifiable item is to be used as a comparison, such as an end of line, what kind of end of line, and its relationship to other identifiable unique identifiable parts. The unique biological characteristic could be a curve and or line given a specific distance that could closely relate to a mathematical formula. Then the program gives that unique identifiable part an identifier such as a number that represents the unique identifiable part and its relationship to other unique identifiable biological parts. This is like storing in a computer a (ASCII) number that represents the letter (A) as compared to storing the actual graphic character (A) and saying that they are the same. They are not the same, nor is the process of storing or that of comparing the two characters the same. One requires the computer to identify the (ASCII) code and then print its representation of what it feels the character (A) should look like. In the comparison process the computer has to identify that the numerical representation of the (ASCII) code is the same number. However, when comparing a graphic representation of the letter (A) the computer program must compare the graphic image pixel by pixel. The computer program does not recognize that the graphic representation is the letter (A), only that the graphic image is the same or not the same whatever the case may be. This process is used in U.S. Pat. No. 4,993,068. There is a similar difference between the way the present invention stores and uses the images of an immutable biological part and the way it is used by the U.S. Pat. No. 4,993,068. While it is true that a graphic file could be quantified into one large number, this number by itself does not evaluate the individual biological characteristics within that file; and the actual individual biological characteristics comparisons are not used to determine a match or no match condition.

Quoting from U.S. Pat. No. 4,993,068 column 9 line 10 "the facial feature biometrics is used for user identification, with the decrypted image displayed to the human operator . . .". Even though the biometrics image is encrypted, it is still a graphic image that is being stored. Again quoting U.S. Pat. No. 4,993,068, column 10 line 60 "collects the biometrics data from the individual. This data is placed into digital form. Next block 106 collects any supporting data and digitize this data. Such data includes security clearances, financial records, employee identification, etc."

"Next, a plain text data package is enervated for the requestor. This data packet is displayed and the authorization site personnel may determine positive proof of who the requestor is and what his privileges are. Next, the composite data set which is created is encrypted and cryptographically sealed." This clearly indicates that U.S. Pat. No. 4,993,068 is using the a graphic image. That graphic image is stored and is used in the comparison process. Even though one could consider a graphic image a unique number, that number, in and of itself, cannot be used to identify the graphic representation of the live biological immutable part when comparing the stored image with the live image. The comparison process must be done pixel by pixel, not by number or unique identification code of the live scan to a stored number or identification code.

The present invention does not store the actual graphic image of the biological part for comparison purposes. What it does do, however, is locate the kind of unique characteristic that the program is looking for, identify that it exists, then give it a unique identifiable code that relates to only that particular biological characteristic. This has several advantages over the use of storing and comparing the graphic representation of the biological feature. Also, this is a substantially different process and requires unique and different processes to store and to compare. To compare two graphic images, which is the case with U.S. Pat. No. 4,993,068, it requires a pixel by pixel analysis. In the present invention, the computer must first locate the unique characteristics that it is programmed to find, identify its characteristics, change it to a unique number or unique identification code, and then compare that with the unique number or unique identification code that is stored in memos. The present invention never compares an actual graphic image with any other graphic image or part thereof.

The main reason for generating the unique identification code is to reduce the amount of memory needed to store enough information to compare the unique biological part to the unique identification code. Second, it makes it possible for the user to decide how many unique biological characteristics to save and to compare. This allows for areas that require high security to have more checks than in areas that require less security to use fewer unique biological identifiable marks. This provides for different media sizes to store different amounts of unique identifiable code. For credit cards the number of unique identifiable codes would be fewer than for media such as computer disks.

None of the above mentioned patents uses any means to determine the quality of the image being read or the quality of the actual biological part. Neither do they provide for a computer program to make enhancements to those images in order to compensate for bad or poor reads and or poor characteristic of the actual biological part. This is a crucial process when comparing biological parts with stored images of those biological parts. Because the lines or identifying ridges and characteristics change from one read to the next, some means must be provided to determine those changes and a way to compensate for those changes. The present invention does that.

SUMMARY OF THE INVENTION

The apparatus of the present invention comprises a fingerprint scanner or reading means for transmitting data obtained from the fingerprint to a computer that analyses the fingerprint and locates the unique biological characteristics and converts those characteristics into a biological identification code. Although the invention relates principally to fingerprints other biological parts can just as easily be used, such as the unique characteristics of the hand, the iris of the eye, the retina, etc. Each of these have unique characteristics that the program can analyze and use for identification purposes.

The computer program identifies what kind of print or quality of the read. It then determines if the image needs to be enhanced. If it needs to be enhanced the program will determine how bad the print is and then give the image a unique identification code that will identify what kind of image was encoded. The program then finds the areas on the image that needs to be enhanced or repaired.

The computer program identifies the type of unique identifiable item, such as, a line end, what kind of line end, and its relationship to other identifiable unique identifiable parts. The program then gives that unique identifiable part an identifier, such as a code that represents the unique identifiable part and its relationship to other unique identifiable biological parts. This is similar to comparing a (ASCII) number that represents the letter (A) as compared to storing the actual graphic character and saving that they are the same. They are not the same, nor is the process of storing or that of comparing the two characters the same. One requires the computer to identify the ASCII code and then print its representation of what it feels the character (A) should look like. In the comparison process the computer has to identify that the numerical representation of the (ASCII) code is the same number. However, when comparing a graphic representation of the letter (A) the computer program must compare the graphic image pixel by pixel. This is a similar difference in the way the present invention and U.S. Pat. No. 4,993,068 store and use the images of an immutable biological The object of this invention is to read a fingerprint into a computer. Then, through a software routine, break down the information contained in the fingerprint into a numeric code. The code is encoded onto the magnetic strip on a card. Once the information is encoded onto the magnetic strip, the program reads the information from the magnetic strip and compares that information to a fingerprint that is then placed onto a fingerprint reader. The system also has the capabilities of printing the transaction including a reproduction of the live fingerprint of the person performing the transaction. The program can then determine if the person using the card is actually the person authorized to use that card. Also, the system can store actual fingerprints in a suitable data storage system which has the capabilities of bringing the fingerprint back to its original picture form. However, since the program deciphers the fingerprint into a numeric representation the actual fingerprint can be stored in a file with a look-up key based upon the numeric representation. This allows the apparatus to read a fingerprint into the system, decipher it, and then find a match in the data base using the deciphered number in rapid sequencing. This makes looking up fingerprints both automatic and very fast.

The reader utilizes an optical scanner to separate the ridges from the valley points on a finger. The is accomplished through use of special optics. The optics in the scanner separates the ridges using the difference between the refraction angle of the ridges touching the optics and the low points not touching. This difference makes it possible to separate the ridges from the rest of the finger optically, producing a better image of the fingerprint, which in turn, produces a better rendering of the fingerprints and a more accurate read. As an option for the fingerprints reader incorporates a means of detecting whether or not the finger to be read is a live finger. This could be accomplished using several techniques. One would be to measure heart, galvanic resistance, and oxygen content. However, the system can use any suitable reader that can render a valid picture of the fingerprint. From this process a video camera, or suitable replacement device capable of reading images into a computer, transmits the image into a computer and/or computer program.

Once the fingerprint is read into the computer, one of two things happens. If this is for encoding the fingerprint onto the magnetic strip of the card, the program first determines the quality of the image or print. It then makes any enhancements that are required and then separates the information it needs and then converts that information to a unique biological characteristic identification code. After it has located the code, it encrypts the number onto the ID card for later use. Thereafter, when a person wishes to use the card, the person places the card into a card reader to bring the information contained on the card back into the computer and its program. The person next places the appropriate finger onto the fingerprint reader or other biological part. The information from the fingerprint reader is then transmitted into the computer and its program; whereupon, the program deciphers the information contained on the card containing the fingerprint information from the other data on the card. The program then deciphers the critical information that came from the fingerprint reader and converts that information to a unique biological characteristic identification code. The program then compares the code that was on the card to the unique biological characteristic identification code that came from the fingerprint reader to see if they both match to within a reasonable tolerance for errors. If they match to the tolerances imposed by the program, then the program indicates a correct read. If they do not match to the given tolerances, then the program indicates an incorrect read. In the event that the transaction is used to validate a check, and the computer indicates a valid read, then the computer program takes the checking account number from the card, and takes the amount of the transaction from the point of sale device and prints the check. In place of the signature the program prints a reproduction of the actual live fingerprint. This provides added security to the transaction. This same procedure can be used to print out credit card transactions as well.

The program is designed to determine what kind of read was made and what level of the quality image was, and then give that print a code that represents that quality, and then make any enhancements. The program locates any unique biological characteristics of the fingerprint and then give these characteristics a unique biological characteristic identification code of the critical identifying characteristics of the person's fingerprint.

This process of determining the quality of the image of the biological part or the quality of the read involves cleaning up the fingerprint image that was given to it by the fingerprint reader. It does this by examining the print to determine the ridges from the valleys. It then makes any corrections or enhancements to the print. Next the program goes through the enhanced print to determine what would be the unique characteristics of that print. It does this by scanning through the print in several directions. It would bring out the high points on each line in reference to the other high points found on each of the other lines by determining the proper order, distance apart, and angles of the ridges. Next, the program finds the low points on each line in an ordered sequence, in the same way as it did for the high points. The program then looks for the high end of lines that do not pass completely through the print's image and determines their location in reference to all other points. The program does this same process for the low end of lines so that at least one end does not pass outside of the print's image.

The program then looks for what are called "islands." These islands are lines both ends of which do not pass through the print's image. The program then determines those islands' location in reference to the other coordinates. It also determines the island's length. The high and the low points are then given in the order that they are found. The program then determines the length of the lines and the patterns of the those lines based upon the number pixels they use to form those patterns. Then the program lays out points along some of the ridges with exact angles and distances from a predetermined point. This gives a very unique number ordering that can only be duplicated by the unique fingerprint of one and only one person.

Determining the quality of the scanned image is critical to the process of comparing different biological parts or images of fingerprints. A poor print or poor read could produce hundreds, sometimes thousands, of end of lines, false (Y) connections, or false (y) separations. In some cases it could even change the curves. The quality of the read or the print could change the location of the unique characteristics from read to read. The length of the lines could also be affected as well as the angles of the lines coming off of the unique characteristics. Without a program that knows how to make the proper enhancements, the fingerprint would have to be almost exact from one read to the next. Obtaining exact reads may be almost impossible. The program can also tell to a great degree what unique characteristics found are accurate and stable from one read to another. Further the program can tell whether or not the image or print is of a poor quality; i.e., does the actual print or image of the biological part appear to be such that in some areas or parts the print is missing or broken up. This condition could be caused by a harsh work environment, such as, masonry or simply dry or chapped hands. The computer program is designed to determine the areas that are too broken up to use. It is designed to determine the kind of print or the quality of the print. Then the program gives each print a unique code so that the program will know what kind of print to expect for comparison purposes. The program is also designed to repair areas that are partially broken up.

With all of the information that can be obtained by these several processes, the number can then be used to duplicate the major characteristics of a person's fingerprint, thus making it possible to correctly identify a unique fingerprint with a minimum amount of data. This allows the number to be placed on the limited space of the magnetic strip of a credit card. It also permits use of this number as the look-up key for a data base containing the actual fingerprint.

The program also determines the size of the fingerprint by calculating the length against the width. These measurements are used to determine the proper scale for the program to use in locating the reference points. The program can take the live fingerprint and manipulate it to adjust for differences in the placement of the finger onto the reader.

During the encoding process, the program converts these coordinates to numbers and then encrypts this information onto a card.

During the matching process the program deciphers the information found on the card back to the proper coordinates and patterns. It then tries to find common points and patterns that match. To find these points, the program can manipulate rotating the image to get different angles and positions. It uses these points and patterns to determine how many other points match the patterns with the required properties and variations. If not enough points match, the program tries to find another set of matching points until a given number of tries have been completed or until a proper number of matches can be found; whereupon, the program will either have found a match or cannot find a match response or indication.

When using the deciphered number to look up fingerprints stored in the system, the deciphered key is taken from the full numeric number stored on the card. In this system, a set of numbers is deciphered from the original number. This sequence is based upon several factors of the fingerprint but basically consist of three sets of numbers with six hexadecimal numbers each. The number can vary, but this number is preferred. The preferred number is 18 characters long. The data base program is designed to take the first set and find as many matching numbers in the key part of the data base. This is adjustable but it is preferred to have at least three matches. The program then takes the next set of numbers and repeats the operation. The same with the third set of numbers. The program then tests to see what set of fingerprints produce the closest match to all three sets of numbers. It then brings all of the fingerprints that match those criteria into the program. It then can visually check the actual fingerprints against the one that was found in the data base to see which one is finally the correct match or determine that there was no match.

The fingerprint reader consists of a device to insert a finger to be read. It uses special optics to separate the ridges from the valleys by using the difference in the refraction angles between the ridges and the valleys on the fingerprint. It also has a device to slide the optics toward the finger until the optics are pushed against the finger at a prescribed pressure. This helps ensure an accurate read. After each read, as an option, a cleaning device cleans the optics where the finger was placed. This is an added security to get the best possible reads. A video camera or suitable replacement is used to bring information into a computer in digital form. This can either be a color or black and white image. Next is the computer. The computer takes the image and blocks the image for the program to decipher, and then runs the program which deciphers the fingerprint.

In summary, the objective of this patent is to process the information on a person's fingerprint in such a way as to allow that information to be placed onto the magnetic strip of a card. Thus, allowing such card holder to be the only person that can use that card for any kind of identification. It is almost impossible to forge as well because the encrypting process puts the fingerprint onto the card. As an option the process can print the transaction along with the actual fingerprint in place of the signature.

THE DRAWING

A preferred embodiment of the invention is illustrated on the accompanying drawings, in which.

DETAILED DESCRIPTION OF PREFERRED EMBODIMENT

Figure 1:
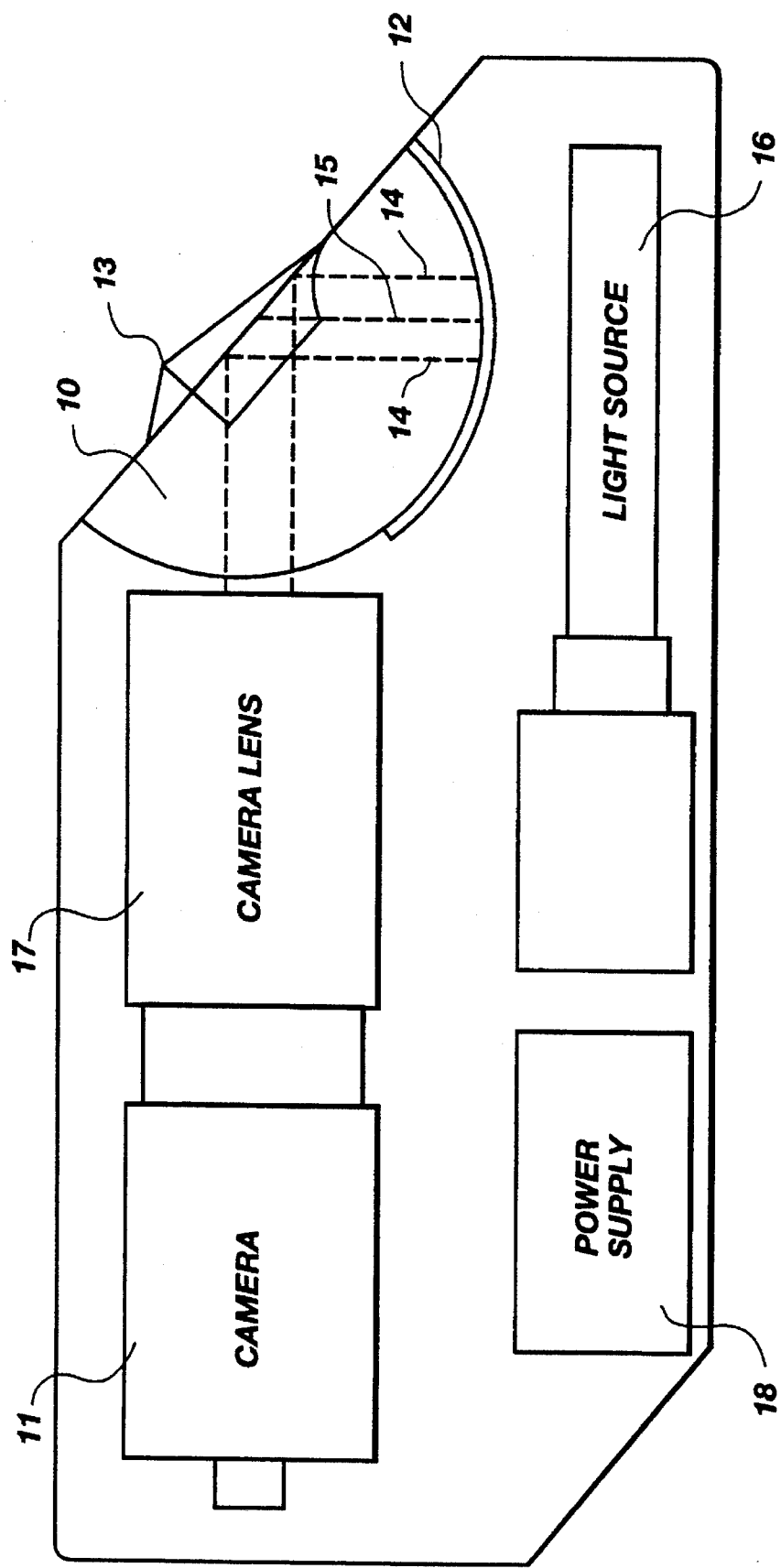
FIG. 1 is a side elevational view of a fingerprint imaging and photographing system of the invention.

While any device that can convert an image to a picture form can be utilized as the fingerprint reader so long as the image is accurate, the preferred device to read fingerprints into a computer is shown in FIG. 1 of the drawings.

Figure 2:
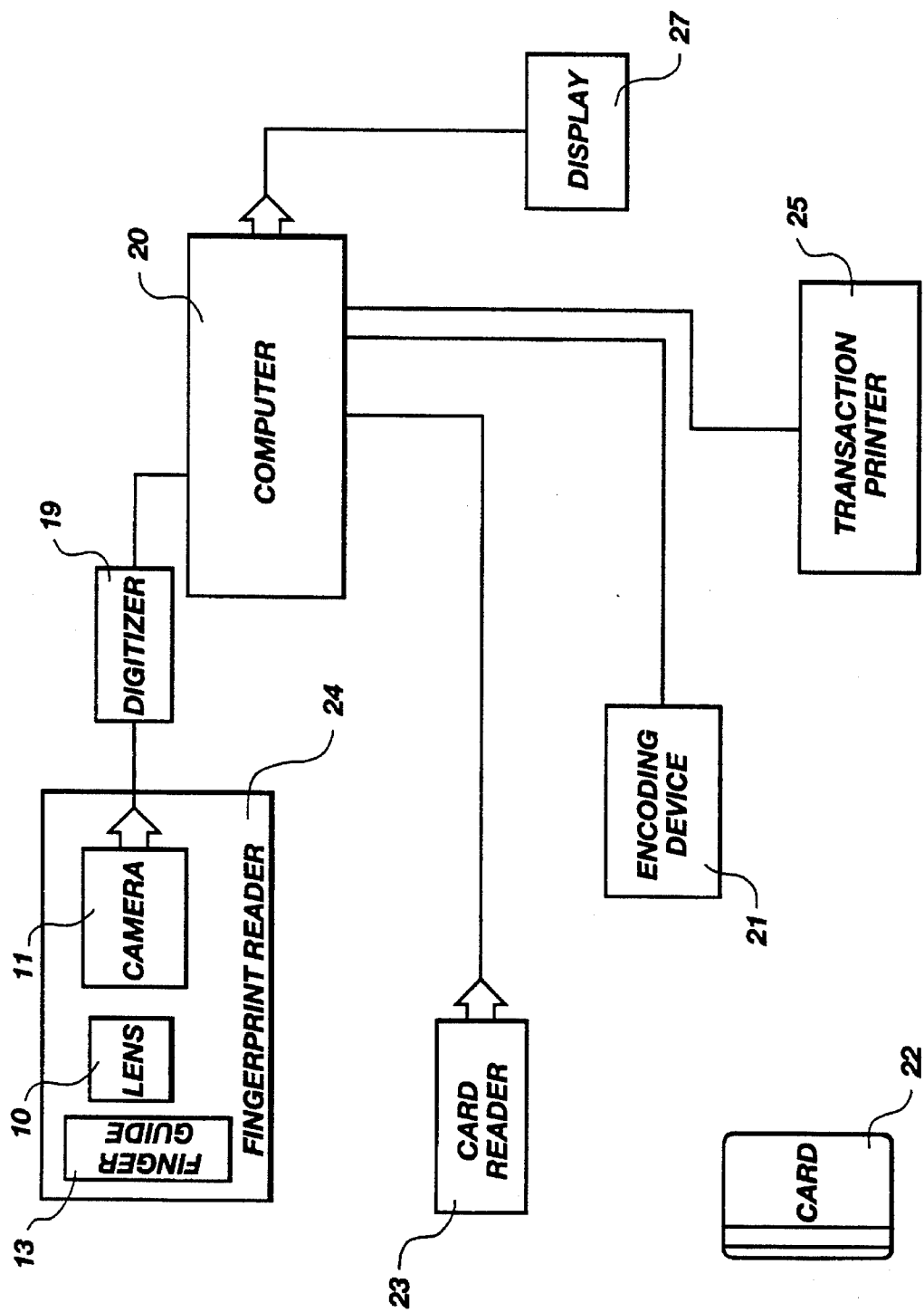
FIG. 2 is a block diagram of the system showing the connection with the various parts of the system.

A preferred fingerprint reader has a lens 10 which must have the capability to cause a proper refraction of the fingerprint. The angle of refraction causes the ridges of the fingerprint to be refracted at a different angle than that of the valleys. While there are several lens that will cause such an effect, such as, magnifying lens placed in the proper location and angles, it is believed the best device for the refraction lens is a half circle. By placing a finger on the lens 10 it is possible to get an image of the fingerprint's ridges only. The actual lens 10 is a half circle and is designed to reflect the refracted image. While prisms have long been used to reflect or change the direction of an image, in this device it is not used for this purpose, The camera 11 does not see the actual image of the finger or fingerprint, but sees only a refracted image. The use of this half circle lens 10, as far as can be determined, has not been used for this purpose. A video camera 11, or suitable replacement which has the capabilities to convert an image into an electrical signal which can be processed by a computer, is set at just the right angle to capture the refracted image of the fingerprint. The light disperser 12 disperses the light evenly across the lens 10. The dispersed light 14 is then reflected to the camera 11 where the fingerprint touches the beam of light 15. The dispersed light 14 is no longer reflected causing a dark area on the lens 10 at that point, This dark area is the ridge portion of the fingerprint, The camera 11 sees the dark area as the fingerprint image. The light source 16 illuminates the lens 10. Item 17 is the camera lens and item 18 is the power supply. Item 13 is a finger holder or finger guide, As shown in FIG. 2, a block diagram showing the electrical and operational connections has a digitizer 19 which takes the signal from the video camera 11, or suitable replacement, and converts the signal into a digital format that is suitable for input to a computer 20. The computer 20 contains a program which deciphers the digitized signal and converts the image to unique numeric representation or unique identification code of the critical biological characteristics on the finger for identification. During the first phase, the process puts the unique biological information code or unique number onto a magnetic strip on the back of card 22, in encrypted format. The computer sends this information to an encoding device 21 that can encode the information onto the magnetic strip on the card. The card 22 is shown in the drawing as a plastic card, such as a credit card with a magnetic strip.

In order to read the data from the card 22, card 22 is sent through a magnetic card reader 23. The user's finger is placed into the fingerprint reader 24, and fingerprint reader 24 containing the finger holder or finger guide 13, the lens 10, and the video camera 11, then sends the fingerprint's image to digitizer 19. From the digitizer 19 the digitized data is sent to the computer 20 where the fingerprint is analyzed by the program to see if the unique biological characteristic code found on the card is the same unique biological characteristic code on the fingerprint that is being read by the fingerprint reader 24.

In some situations it may be desirable to print the actual fingerprint onto the transaction, such as a check, credit card transaction, or the like, in place of a signature. This is accomplished using a transaction printer 25 for printing an image of the fingerprint onto the transactional document or check.

A light source 16, shown in FIG. 1, can be used to illuminate the object being read by the video camera 11 or fingerprint reader 24. A display 27 can also be employed to indicate a good or bad read at the point of use.

This would make it possible to have the computer print checks without held from an attendant, such as in self-service grocery stores and self service gas stations. The customer scans the card and places a finger into the finger holder or finger guide 13. The computer 20 then verifies whether or not he/she is the legal owner of the card. The computer 20 prints the check and places the fingerprints of the person making the transaction onto the check or credit card transaction, making the card almost impossible to forge or to be used by anyone other than the legal card holder.

To use an ATM machine for bank transactions, there would be no need for a PIN number. The system would verify legal ownership on the basis of the fingerprint of the individual using the card. The system could also be used to verify telephone credit card transactions. The reader, the computer, and the program could be used for keyless locks. In some applications the card is not necessary, such as situations where a limited number of people have access. These could be used for keyless entries into homes, cars, and even computers. This invention could also be used for almost any type of unattended security entry, such as security areas at work, for the government, for hotels, etc.

A computer program that enhances the biological characteristic image takes the digital representation of the image and through a special process finds areas where the image is not clear. It also takes those unclear areas and calculates what the missing parts of the image should look like. On fingerprints, for example, during the process of capturing the fingerprint image, some of the ridges or valleys may be lost or distorted. This program can calculate where the missing or distorted ridges and valleys should be and where they should connect.

Figure 3:
FIG. 3 is a view of a fingerprint image.

The computer program takes the live scanned biologic image, digitizes it and then finds the unique characteristics FIG. 3. It identifies the kind of characteristic that it is and then computes the relative location for those unique biological characteristics to be found. The program then assigns a unique number or unique identification code to that found biological characteristic. The program then stores that and any other biological characteristics hat it found onto some storage or memory device.

To compare a live scanned biological image to that of the stored unique identification codes, the computer program finds all of the unique characteristics of the live canned biological image. The computer program then identifies or determines what kind of unique characteristics they are. The computer program then determines their relative positions. From this information a unique number or unique identification code is generated. The computer program then takes the stored unique identification code or unique number and compares it to see if the unique characteristics are in the relative position and of the same kind. In other words, it determines if the two unique numbers or unique identification codes are the same.

Figure 4:
FIG. 4 is a view of another fingerprint image.

FIG. 4 represents a fingerprint that has not been enhanced by the computer program. From this Fig. it is apparent that the print did not come in as clear as it should have. This would be a difficult print to match every time because of the number of places on the print that the lines are somewhat broken. The computer program would have a difficult time in identifying the end of lines, the (Y's) or even line characteristics with any degree of accuracy. As can be seen by this Figure, it would also be difficult to confine the end of lines to a small enough number to allow them to be put onto a memory device of 100 bytes or smaller. Without enhancement it would be difficult for a graphic comparison to be made as well. Because the print could be brought into the computer differently depending how good the read was, it would be almost impossible for an accurate comparison to be made using graphic comparisons as well. To encrypt such a fingerprint the encryption would be very different from one read to the next. For example, in FIG. 4, 34, 35, 36, and 37 show areas that would change dramatically if the fingerprint image came in with the lines connected in those areas compared with the lines coming in the way that they do in FIG. 4.

This process becomes even more difficult when comparing actual characteristics of the fingerprint image if at one time the lines come in well connected and at other times the lines come in broken as they are in FIG. 4. From FIG. 4, 38 should be categorized as a (Y) while 39 and 40 would be categorized as being an end of line. However, with the enhanced fingerprint image as shown in FIG. 4 this would be very difficult to identify.

Figure 5:
FIG. 5 is a view of yet another fingerprint image.

The same area in the enhanced fingerprint image 43 as shown in FIG. 5, is clearly defined as a (Y) and items 41 and 42 are easily defined as end of lines. Also, the number of unique characteristics that can be defined is drastically reduced. In doing a graphical comparison the enhanced image also is much more consistent and greatly enhances the chances of making matches where they are supposed to match and preventing matches where they are not.

A detailed explanation of the computer program follows. The computer program locates the unique biological characteristics FIG. 3 that the computer program is programmed to locate. For example, the computer program may be programmed to look for end of lines 28. It may be programmed to look for specific kinds or types of end of lines and relative position along with the relative general direction the line is coming from or relative angle. The computer program may be programmed to locate length of lines 29 and determine their relative slope, or relative angle and relative position. The computer program may be programmed to look for curves 31, the radius of the curves, their relative position, and the tangent line at the smallest radius on the curve. The computer program may be programmed to locate curves on a line 30 over a specific distance and then use a formula to represent that curve. The computer program may be programmed to locate lines and associate those lines with specific formulas 33 to represent those lines for specific distance on those lines. The computer program may be programmed to locate lines where they join 32.

When the computer program locates and identifies the type of biological characteristics that the program is programmed to find, it then gives those images of the unique biological characteristics a unique code. This code is stored on some storage medium for later use by the program to identify the identity of the person trying to gain access to some device.

In comparing a live biological characteristic to that of the stored unique biological characteristic identification code, the program finds on the live scanned image the same type of biological characteristics. If the biological characteristics are found, the program then checks to see if they are in the same relative location. If the predetermined number of biological characteristic identification codes match, then the computer program indicates a match condition. If the predetermined number of biological characteristics do not match, then the computer program indicates a no match condition.

As previously mentioned, this device and/or program can analyze other biological vans as well. The hand can be scanned into the program through a hand reader. The program analyzes high points, low points, length of the hand against the length of the fingers in relation to the width of the hand. The system could select various lines in the hand and measure the length and the angles in relation to other parts of the hand. A unique number would be developed which could later be checked against a live hand in much the same way as the fingerprint.

The iris of the eye can also be employed. The iris has a unique color pattern. The color patterns and dots of color in the eye are unique patterns that the program can equate to a number in the same way that it analyzes the fingerprint. The patterns of colors and the dots of colors in an iris form a unique pattern that when scanned will yield angles, distance, islands, and end of lines that are relative to each other and will render a reproducible unique characteristic identification code or unique number that can be used to identify the person. That unique biological characteristic identification code or unique number would be small enough to be placed upon the magnetic strip of an ID card and/or stored onto the mass storage of a computer the same way that the fingerprint number is used.

None of the prior art patents includes a process for enhancing the images. This is a significant improvement because the fingerprint image changes dramatically from one read to the next. Even in using graphic comparisons, changes in the quality of the read could have a major impact on the ability to determine whether or not to accept or reject the fingerprint. This could be used in all types of biological comparator devices and should improve all of the current patents.

While this invention has been described and illustrated herein with respect to preferred embodiments, it is understood that alternative embodiments and substantial equivalents are included within the scope of the invention as defined by the appended claims.

I claim:

1. An apparatus for reading unique identifying characteristics from a body part, transmitting said unique identifying characteristics to a computer, digitizing the characteristics, and then having a computer with the ability to separate out from the whole unique identifying characteristics into separate unique identifying characteristics and then distinguish and identify the different unique characteristics and then giving each of those unique identifying characteristics a unique code that represents the unique identifying characteristics type and location relative to other unique identifying characteristics for the purpose of affixing them on an identification document, or electronic storage medium including the following components:

means for transferring the characteristics from a camera means to a digitizer;

means for transferring the characteristics from the digitizer to the computer for the purpose of separating out from the whole image each unique identifying characteristic;

means for identifying each unique characteristic by type;

means for giving each identifying characteristic its own unique code which is comprised of the type and also relative location;

means for transmitting the unique identification characteristics code to the computer for storage and processing; and means for imprinting the unique identification characteristics codes on the electronic storage medium.

2. An apparatus as set forth in claim 1, including the components of:

means for reading the characteristics from a live impression of a body part;

means for digitizing the live impression;

means for transmitting said digital impression to a computer;

means for separating out from the characteristics its unique identifying characteristics and identifying them by type and position;

means for comparing in the computer a set of stored unique identification characteristic codes the codes derived from the live digitized impressions of the live body part to establish identity of both the inputs: and means for sending a signal to verify the identity of the person evidencing the live impression of the body part.

3. An apparatus as set forth in claim 2, wherein the reading of the characteristics from a live impression of a body part uses a lens that has the capacity to have within itself internal reflection that when a certain type of material touches the outside portion of the lens that at the point of touching the internal reflection is destroyed and an image of where the internal reflection is destroyed is transmitted to a camera.

4. An apparatus as set forth in claim 3, wherein the lens is a prism.

5. An apparatus as set forth in claim 2, wherein said body part is a fingerprint.

6. An apparatus as set forth in claim 2, wherein said body part is a handprint.

7. An apparatus as set forth in claim 2, including printing an impression of the body part on a transactional document.

8. An apparatus as set forth in claim 1, wherein the camera means is a video camera.

9. An apparatus as set forth in claim 1, wherein said body part is a fingerprint.

10. An apparatus as set forth in claim 1, wherein said body part is a handprint.

* * * * *